Aug. 18, 1970  E. J. BARRETT ET AL  3,524,267
SPACE-FILLING ATOMIC AND MOLECULAR ORBITAL MODEL SETS
Filed Sept. 5, 1968  3 Sheets-Sheet 1

INVENTORS
EDWARD J. BARRETT
JOHN C. POWERS, JR.
BY
Auslander + Thomas
ATTORNEYS

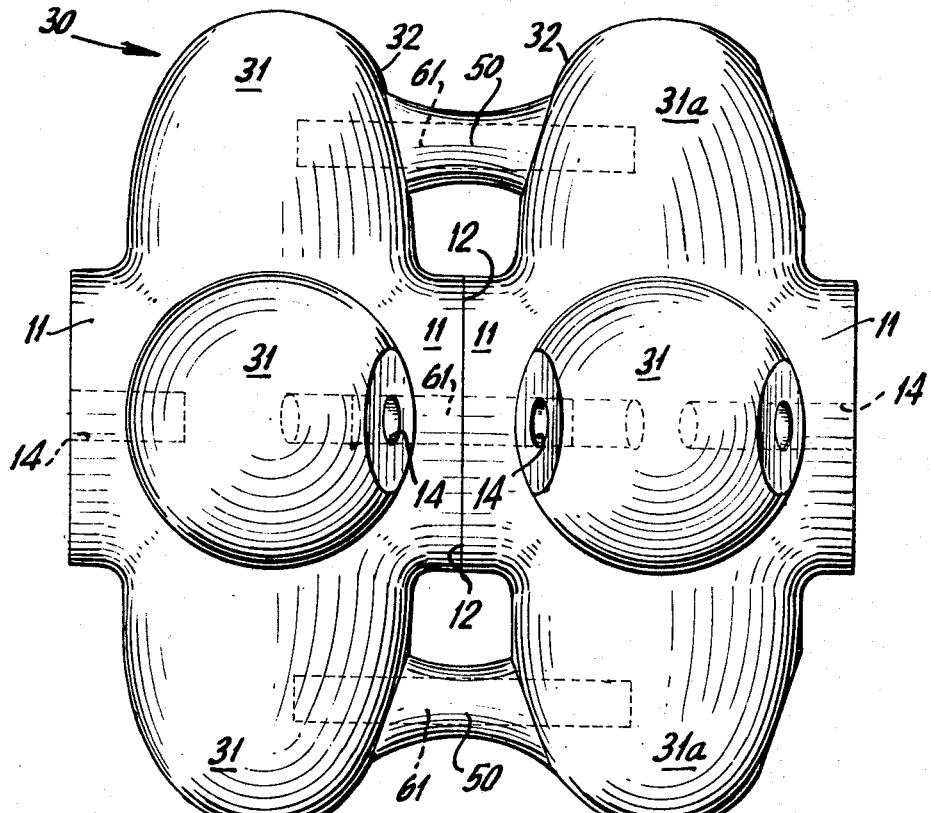
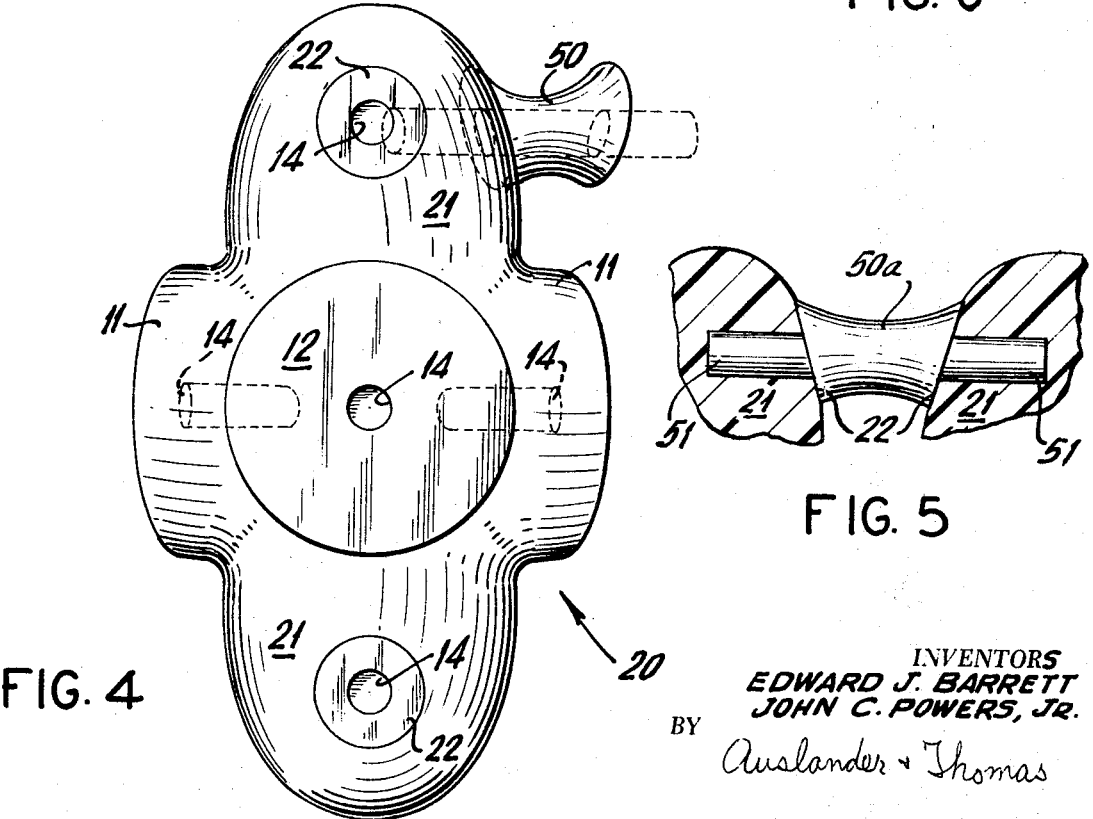
FIG. 6
FIG. 5
FIG. 4
INVENTORS
EDWARD J. BARRETT
JOHN C. POWERS, JR.
BY Auslander & Thomas
ATTORNEYS Aug. 18, 1970     E. J. BARRETT ET AL     3,524,267

SPACE-FILLING ATOMIC AND MOLECULAR ORBITAL MODEL SETS

Filed Sept. 5, 1968     3 Sheets-Sheet 3

INVENTORS
EDWARD J. BARRETT
JOHN C. POWERS, JR.
BY
Auslander & Thomas
ATTORNEYS

United States Patent Office 3,524,267
Patented Aug. 18, 1970

3,524,267
SPACE-FILLING ATOMIC AND MOLECULAR
ORBITAL MODEL SETS
Edward J. Barrett, 129 Evandale Road, Scarsdale,
N.Y. 10583, and John C. Powers, Jr., 103 Cherry St.,
Floral Park, N.Y. 11001
Filed Sept. 5, 1968, Ser. No. 757,532
Int. Cl. G09b 23/26
U.S. Cl. 35—18
19 Claims

ABSTRACT OF THE DISCLOSURE

The present invention provides a space-filling atomic or molecular orbital model set generally providing four primary modules representing trigonal bipyramidal, tetrahedral, octahedral and spherical geometries so constructed as to provide truncated lobes for selective interrelationships.

---

The present invention relates to a space-filling atomic or molecular orbital model set.

It has been found helpful both for teaching purposes and for research to be able to observe and construct atomic and molecular models. Based on such models, greater understanding of chemical characteristics may be had as well as an ability to understand or predict chemical reactions.

Many model sets have been provided in the past to construct or display atomic or molecular structure. The most common types have been space-filling models, framework models or combinations thereof. The usual model, whether space-filling or framework, has some provision for joining the parts to indicate the theoretical or three-dimensional shape of the atom or molecule to a high degree of probable accuracy and often provides orbital lobes in proportion to Van der Waals radii.

A problem of the past has been that relatively accurate models adapted to display a wide variety of atoms or complex molecules have often been prohibitively expensive, inaccurate, or difficult to use; such models have also combined many or all such problems in one set.

It has been found that the electrons surrounding the atomic nucleus can be considered in terms of defined shapes which substantially represent the mathematically calculated probable volume of maximum electron density about the nucleus. These shapes are called orbitals whose radii are also calculable for either the atomic structure or in molecular combinations. The orbitals of atoms in a molecule, when joined in bonds by overlapping of orbitals are of somewhat modified shape depending upon the atoms joined in such bond. Where a bond is formed by linear overlap of two orbitals it is referred to as a sigma bond. Where orbitals form a bond by overlapping above and below the plane of the sigma bond such a bond is referred to as a pi bond. The pi bond in this molecular geometry has the appearance of two bonds and is characteristic of unsaturated molecules. The sigma bond is characteristic of saturated molecules.

Especially with the elements in the first two periods of the periodic table the geometry of atoms and combined atoms have a limited number of shapes. The atoms are substantially of similar size within a period.

The most common orbital geometries displayed by atoms in molecules are the tetrahedral, trigonal bipyramidal and octahedral. These geometries may be represented by radii from the epicenter of the geometric figure to or toward the apices of the geometric figures or by openings in a basic atom model having axes angulated to the same angles as the radii.

In theory it is generally believed that the radial length of a pi lobe is substantially the same as that of a hybrid orbital insofar as the elements of the second period are concerned. Where models represent carbon, for instance, the particular angles of each of the orbitals of carbon in various bonding situations are well known.

A tetrahedral module of a carbon atom, unbonded, has its axes at an angle of 109° from the center with relation to each other and are calculable as the length of radii necessary to reach the apices of a tetrahedron from its epicenter. Another module, the trigonal bipyramid, has its $p$ lobes passing through its center and extending equally at a straight angle from the center with three hybrid lobes extending from the center 90° away from the $p$ lobes at an angle of 120° from each other. A carbon module, the octahedron, has two sets of $p$ lobes passing through the center of the module at a straight angle spaced apart 90° on the same plane and equally divided within the two hybrid lobes at right angles to the $p$ lobes which extend from the center of the module.

The geometric orbital shapes of the atoms of the second period in molecules are very close to the various shapes of the carbon atom. The angle differences in other elements in the second period are usually too small to require different model modules in order to show fairly accurate geometry in atoms or molecules.

Hydrogen and helium atoms are best shown in orbital form as substantially spherical. A sigma bond such as a hydrogen atom orbital overlapping a carbon atom orbital has a resultant shape which, in this instance, would be ellipsoidal with a bulging round end.

Models of the past have relied upon the geometry of the elements but have usually been either in the form of space-filling balls representing an atomic core, or framework molecular models including sticks radiating from a point in each atom. Models which have tried to combine proper angulation and space filling functions have had to sacrifice space filling accuracy of simplicity and flexibility to make an inexpensive model set.

Beyond the first and second periods changes in atomic and molecular geometries occur, yet for the purposes of model sets many atoms or molecules have geometries sufficiently similar to the basic shapes as to be useable in model sets either in size proportion or with some minor distortion.

According to the present invention, a space-filling model set is provided with a minimum number of modular parts useable and assemblable to display substantially accurate space-filling models of atoms and molecules of varying complexities.

Although such novel feature or features believed to be characteristic of the invention are pointed out in the claims, the invention and the manner in which it may be carried out may be further understood by reference to the description following and the accompanying drawings.

FIG. 4 is an elevation view of a trigonal bipyramid module of the present invention with a pi bond connector module of the present invention.

FIG. 5 is a detail of a pi bond connector module of the present invention joining two orbitals.

FIG. 6 is a plan view of joined octahedral modules of the present invention showing one complete pi bond.

Referring now to the figures in greater detail, where like reference numbers denote like parts in the various figures.

Each atom has its geometric pattern based upon a mathematical combination of its energy levels. The patterns are resultants of $s$ and $p$ orbitals and represent the probability of finding an electron within a given volume. In forming molecules the orbital patterns are modified based upon the type of bond or combination.

Figure 1:
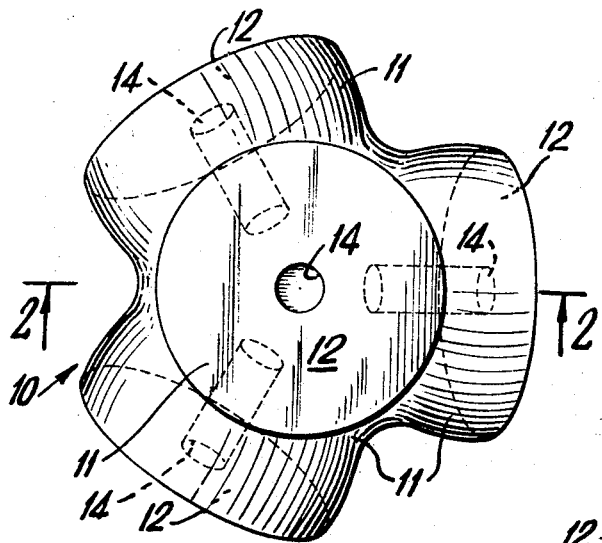
FIG. 1 is a plan view of a tetrahedral module of the present invention.

In FIG. 1 a first unitary module 10 is shown having truncated ellipsoidal lobes 11. These lobes 11 radiate on axes from the epicenter of the module in the direction of the apices of a regular tetrahedron having its epicenter in the epicenter of the first module 10. The lobes 11 at their truncated faces 12 preferably represent one half of the entire theoretical lobe length.

The first module 10 is best representative of atomic space-filling shapes in the second period of the periodic table, though for some model uses, a fair degree of accuracy may be obtained using such shapes for other atoms or even some radicals.

Providing different select colors to all the modules has been found satisfactory to differentiate different specific atoms or radicals, for instance, so that a better visual differentiation may be had when modules are joined in molecular space-filling orbital patterns.

Figure 3A:
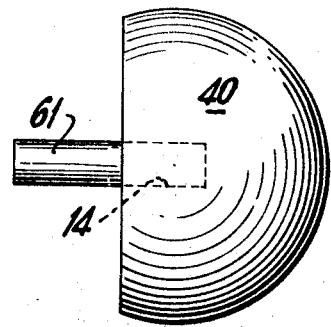
FIG. 3a is an elevation of a spheroidal module of the present invention.
Figure 3:
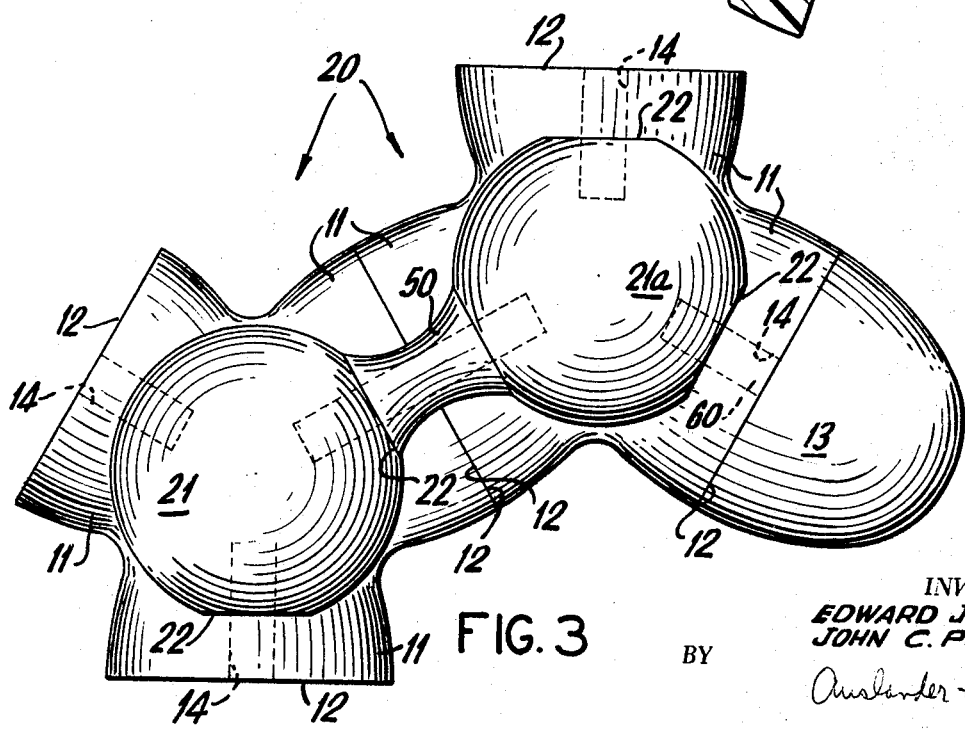
FIG. 3 is a plan view of joined trigonal bipyramid modules of the present invention with various bonds.

The second unitary module 20 as shown in FIGS. 3 and 4 is provided with three truncated ellipsoidal lobes 11 preferably of the same diameter at their faces 12 as the first module's 10 lobes 11. The second module 20 represents another atomic orbital space-filling shape wherein the orbital axes radiate in the form of radii from the epicenter of the module 20 toward the apices of a trigonal bipyramid. Thus, the second module 20 is provided with three truncated lobes 11 and a pair of additional lobes 21. The additional lobes 21 each are preferably twice the length of the truncated lobes 11.

Figures 7, 8, 9:
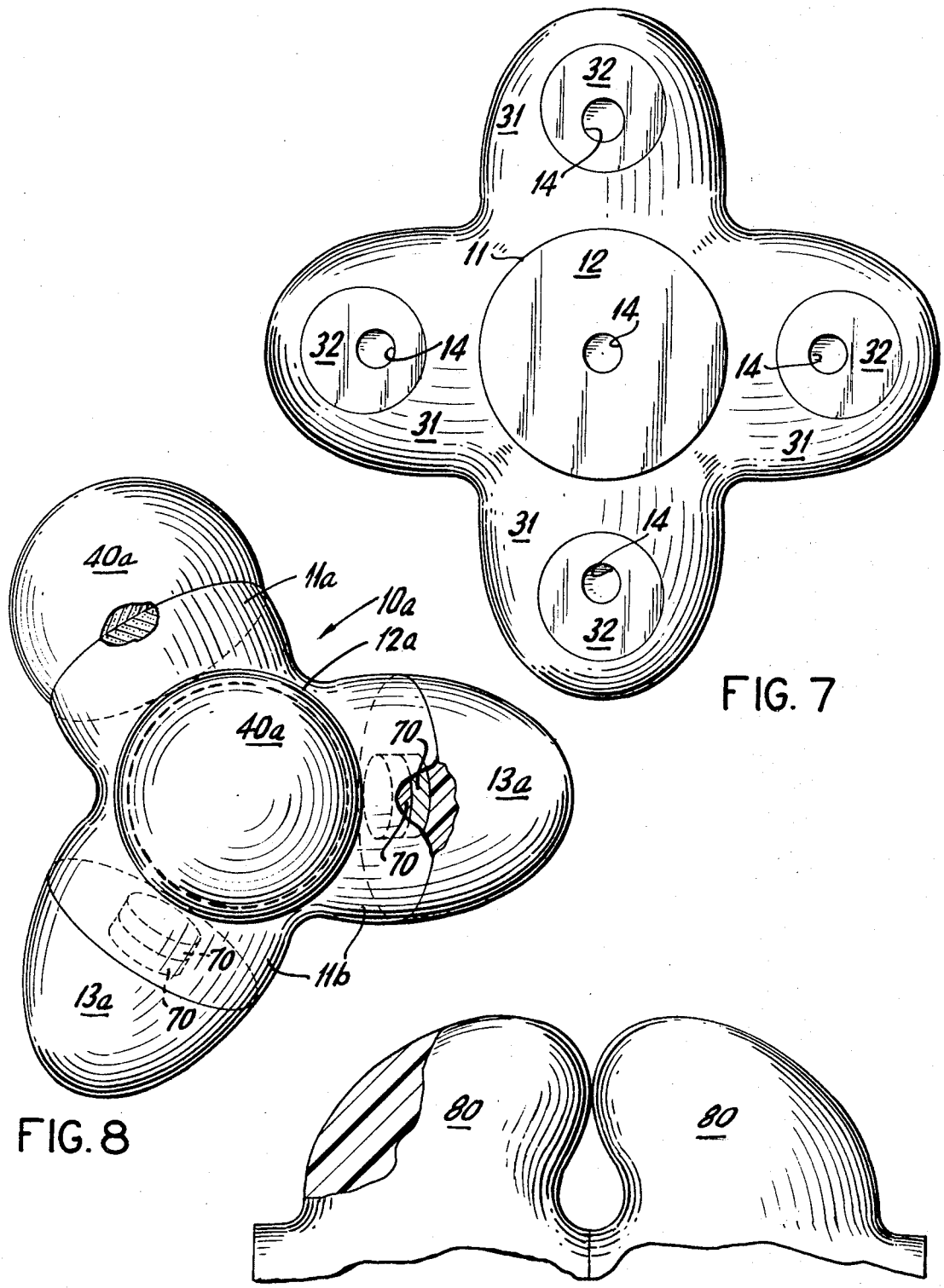
FIG. 7 is an elevation of an octahedral module of FIG. 6.
FIG. 8 is a plan view of a model of a water molecule of the present invention.
FIG. 9 is a detail view of a plastic module embodiment of the present invention showing one portion of a pi bond.

The third unitary module 30 as shown in FIGS. 6 and 7 is provided with only a pair of truncated ellipsoidal lobes 11 preferably of the same diameter at their faces 12 as the truncated lobes 11 of the first and second modules 10, 20. The third module includes two pairs of additional lobes 31. The axes of all the lobes 11, 31 radiate from the epicenter of the module 30 in the form of radii from the epicenter of an octahedron toward the apices of the octahedron.

The fourth module 40, as shown in FIG. 3a is in the form of a truncated spheroid. In its preferred form the module has a substantially proportional theoretical diameter of an atom of the first period, though as will be later shown the module 40 does not have to be so limited in the model set of the present invention.

In the construction of atomic or molecular models the basic modules must be provided with connecting means or shapes to complete the flexibility of the set of the present invention in its ability to exemplify many complicated structures.

In some situations it may be necessary to complete an orbital lobe to represent a particular structure. Complementary modular lobe portions 13 such as the one shown in FIG. 3 connect with the truncated lobes 11 to complete the ellipsoidal space-filling orbital.

The additional lobes 21 of the second module 20 are preferably provided with cut-away surfaces 22 which may be joined by connectors 50.

In the preferred embodiment of the module 20 each additional lobe 21 has only two cut-away surfaces 22 spaced equidistantly from the center of the module toward the ends of the lobes 21; each surface 22 on complementary lobes 21 aligned facing in the direction of the same two axes of the truncated lobes 11.

As shown in FIG. 3, as a matter of convenience the lobes 21a may be provided with three such faces 22 although only two on each lobe are used at the same time, ordinarily.

By the same token the lobes 31 of the third module 30 are provided with cut-away surfaces 32; each lobe pair 31 having the surface aligned along the axis of the same truncated lobe 11. The connector 50 is preferably useable with both the second and third modules 20, 30.

As a matter of convenience for molding purposes or otherwise, more than one surface 32 may be included as shown in FIG. 6 on lobes 31a although only one surface 32 on each module 30 lobe 31 is used with the connectors 50.

Figure 2:
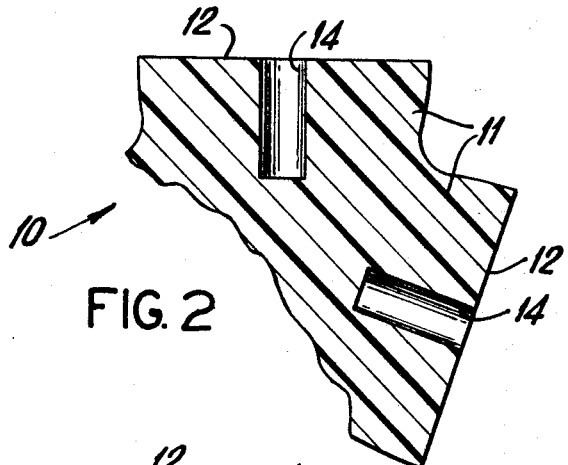
FIG. 2 is a partial section of FIG. 1 at lines 2—2.

In the construction of a variety of different atomic or molecular orbital space-filling combinations, the building blocks have been set forth. These blocks must be connectable by some means. In FIGS. 1–7 friction means are shown. The modules 10, 20, 30 are provided with openings 14. The complementary lobe 13 as shown in FIG. 3 is provided with an integral pin 60 as one of connector. The integral pin 60 is frictionaly held in the openings 14 to join the modules when desired. In lieu of the integral pin 60, a pin 61 as shown in FIG. 3a may frictionally join parts as an independent connector. In FIG. 2, a section of the first module is shown, indicating the pin connector openings.

In FIG. 8 a constructed module is shown where the module 10a has magnetized truncated lobes 11a such as made from a ferro-magnetic plastic, joining the truncated spheroid, that is the fourth module 40a. The truncated lobes 11b are joined to the complementary ellipsoidal lobe portions 13a held together by embedded magnets 70.

In the practical construction of an atom, for example a carbon atom, the first module 10 may be colored black and with its four truncated lobes 11 capped with black complementary lobes 13, thus showing a carbon atom in its $sp_3$ state.

While according to present theory the axes of the first module's 10 lobes may vary a bit, for the purpose of a model set, the first module 10 might be blue to represent nitrogen with complementary lobes 13 in blue to show a nitrogen atom in its $sp_3$ space-filling orbital state. The second module 20 with lobes 13 represents an $sp_2$ state and the third module 30, as capped, an $sp$ state.

A black first module 10 with its lobes 11 capped with a truncated spheroidal fourth module 40 in white; where black represented carbon and white hydrogen, would show a methane molecule $CH_4$. The composite shape would thus show a sigma bond between the fourth module 40 at the face 12 of the truncated lobe 11.

In FIG. 3 two second modules 20 are shown with one sigma bond of the lobes 11 at their faces 12 and an orbital is shown as a completed unbonded lobe with the truncated lobe 11 completed by the complementary lobe 13. In FIG. 3 the additional lobes 21, 21a are shown in a plan view showing one half of a pi bond between the atoms.

The connectors 50a joining the additional lobes 21 as shown in FIG. 5 may be spindled on pin 51 or may have integral pins as with the one-piece connector 50.

In FIG. 6, two third modules 30 are shown with a single sigma bond of the lobes 11 at their faces 12 using pins 61. A full pi bond of the lobe pairs 31, 31a is shown as the lobes 31, 31a are joined by connector 50.

In FIG. 8, a complete molecular structure is shown. The model could be used to represent $H_2O$ where the first module 10a was colored red. The two unbonded orbitals would be completed with complementary lobes 13a preferably in red attached to the truncated lobes 11b. The truncated spheroids 40a, preferably colored white form a sigma bond at the faces 12a. The colors are preferable to differentiate atoms and to avoid confusion as to the atomic identity of the complementary lobes 13a.

The broad nature of the substances from which the parts and modules of the present invention may be made allows use of deformable materials which may yield to make models of strained molecular geometry. Yieldable plastic, lead, and other metals are readily adaptable.

In FIG. 9 simple deformation of p lobes 80 is shown as they are formed into a pi bond using deformable materials for the modules.

The flexibility of the molecular orbital model set may be shown in a chemical molecular model such as:

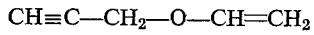

In model form, a white fourth module 40 would be sigma bonded to truncated lobe 11 of a black third module 30. The outer truncated lobe 11 would be sigma bonded to a truncated lobe 11 of another black third module 30. The eight lobes 31 would be connected with four connectors 50 completing two pi bonds. A black first module 10 would be sigma bonded to the third module's 30 outer truncated lobe 11 and two fourth modules 40 would be joined to two of the first module's 10 truncated lobes 11; the fourth lobe 11 would be sigma bonded to a first module 10 in red to indicate it was oxygen. Two of the truncated lobes 11 would have red complementary lobes 13 attached, indicating unbonded orbitals. The fourth lobe 11 of the red module 10 would be sigma bonded to a truncated lobe 11 of a black carbon second module 20 with a sigma bonded white fourth module 40 on the second truncated lobe 11. The third truncated lobe 11 would be sigma bonded to a truncated lobe 11 of another second module 20, the additional lobes 21 of both would be joined by connectors 50 to form a single full pi bond. The remaining truncated lobes 11 would be sigma bonded to two white fourth modules 40 completing the model.

While some space-filling disproportion would be involved, more complicated molecular models could be made such as larger sized truncated spheroid fourth modules 40 to represent a Br for instance, with a valence of (−1) minus one.

The terms and expressions which are employed are used as terms of description; it is recognized, though that various modifications are possible within the scope of the invention claimed.

Having thus described certain forms of the invention in some detail, what is claimed is:

1. A space filling atomic or molecular orbital model set comprising a plurality of optionally selectable modules including, a first unitary module; said first module having four truncated ellipsoidal lobe portions; said lobe portions on an axis extending substantially in the direction of the apices of the configuration of a regular tetrahedron having its epicenter in the center of said first module, a second unitary module; said second module comprising a set of three truncated ellipsoidal lobe portions; said truncated lobe portions each extending on an axis radiating in a plane distributed about the center of said second module; said second module further including two additional lobes; each of said additional lobes extending on an axis from the central portion of said module substantially at an angle of 90 degrees from the plane of said truncated lobe portions, a third unitary module; said third module comprising a set of two truncated ellipsoidal lobe portions; said truncated lobe portions each extending on an axis passing through the center of said third module; said third module further including four additional lobes radiating in a plane about the center of said third module; each of said additional lobes extending in a plane substantially 90 degress from the axis of said truncated lobe portions, complementary modular truncated lobe portions optionally adapted to be attached to said truncated lobe portions completing a substantially regular ellipsoidal figure, truncated spheroidal modules larger than said complementary lobe portions, attaching means adapted to selectively attach said truncated portions of said modules, and modular means adapted to connect selected pairs of said additional lobes of said second and third modules.

2. The invention of claim 1 wherein all said truncated lobe portion faces are substantially of the same diameter.

3. The invention of claim 1 wherein all said module additional lobes are substantially the total length of a truncated lobe portion with a complementary truncated lobe portion.

4. The invention of claim 1 wherein all said module additional lobes are ellipsoidal.

5. The invention of claim 1 wherein the end portions of said module additional lobes include cut away portions, said cut away portions equidistant from the center of said respective modules.

6. The invention of claim 5 wherein said cut away portions face in the direction of the axis of each of said module's truncated lobe portions.

7. The invention of claim 5 wherein said additional lobes of said second module include only two cut away portions each facing in the direction of the axis of the same two module's truncated lobes and said additional lobes of said third module having only one cut away portion each facing in the direction of the axis of the same module's truncated lobes.

8. The invention of claim 5 wherein said means adapted to connect selected pairs of additional lobes have faces complementary to said cut away portions and span the distance between said lobe faces when said modules are spaced apart by matching truncated ellipsoidal lobe portions of said modules.

9. The invention of claim 1 wherein said attaching means between all said modules are magnetic.

10. The invention of claim 1 wherein all said modules are connected by friction means.

11. The invention of claim 1 wherein said first module represents a given atom and said radii with said complementary modular lobe portion are proportional to Van der Waals radii for said atom.

12. The invention of claim 1 wherein said modules and complementary modular lobes are the same color.

13. The invention of claim 12 wherein said modules are of optionally selected colors.

14. The invention of claim 1 including selection of a plurality of spheroidal modules of increasing sizes.

15. The invention of claim 1 wherein each said axis of said first module is at an angle 109 degrees from each other.

16. The invention of claim 1 wherein each said axis of said truncated lobes of said second module is at an angle of 120 degrees from each other.

17. The invention of claim 1 wherein the axes of all said third module lobes are in pairs and the lobe pairs are at an angle of 90 degrees from each other.

18. The invention of claim 1 wherein all said modules are adapted to be connected by pins.

19. The invention of claim 1 wherein said model set parts are adapted to be deformed to connect for a typical bonding.

References Cited

UNITED STATES PATENTS 2,308,402    1/1943    Taylor _____ 35—18
3,333,349    8/1967    Brumlik _____ 35—18

EUGENE R. CAPOZIO, Primary Examiner

H. S. SKOGQUIST, Assistant Examiner